United States Patent
Immordino

(10) Patent No.: US 6,406,537 B1
(45) Date of Patent: Jun. 18, 2002

(54) HIGH-STRENGTH JOINT COMPOUND

(75) Inventor: Salvatore C. Immordino, Trevor, WI (US)

(73) Assignee: United States Gypsum Company, Libertyville, IL (US)

( * ) Notice: Subject to any disclaimer, the term of this patent is extended or adjusted under 35 U.S.C. 154(b) by 45 days.

(21) Appl. No.: 09/718,279

(22) Filed: Nov. 22, 2000

(51) Int. Cl.$^7$ ................................. C04B 11/06
(52) U.S. Cl. ................ 106/778; 106/698; 106/772; 106/775; 106/776; 106/782; 106/814
(58) Field of Search ................ 106/698, 772, 106/775, 776, 778, 782, 814

(56) References Cited

U.S. PATENT DOCUMENTS

| | | |
|---|---|---|
| 3,414,462 A | 12/1968 | Cafferata |
| 3,445,323 A | 5/1969 | Schnabel |
| 3,622,361 A | 11/1971 | Pennington et al. |
| 3,719,513 A | 3/1973 | Bragg et al. |
| 4,587,279 A | 5/1986 | Salyer et al. |
| 4,729,853 A | 3/1988 | von Bonin |
| 4,876,142 A | 10/1989 | Piccirillo |
| 4,883,536 A | 11/1989 | Burdick |
| 5,258,069 A | 11/1993 | Knechtel et al. |
| 5,268,466 A | 12/1993 | Burdick |
| 5,334,243 A | 8/1994 | Hyman |
| 5,482,551 A | 1/1996 | Morris et al. |
| 5,534,059 A | 7/1996 | Immordino, Jr. |
| 5,569,323 A | 10/1996 | Frouin et al. |
| 5,702,828 A | 12/1997 | Adler et al. |
| 5,741,844 A | 4/1998 | Nass et al. |
| 5,746,822 A | 5/1998 | Espinoza et al. |
| 6,340,388 B1 * | 1/2002 | Luongo ............... 106/675 |
| 6,342,284 B1 * | 1/2002 | Yu et al. ............. 106/772 |

FOREIGN PATENT DOCUMENTS

| | | |
|---|---|---|
| WO | WO 99/08979 | 2/1999 |
| WO | WO 00/06518 | 2/2000 |
| WO | WO 00/34200 | 6/2000 |

* cited by examiner

Primary Examiner—Elizabeth D. Wood
(74) Attorney, Agent, or Firm—John M. Lorenzen; David F. Janci; Leydig, Voit & Mayer, Ltd

(57) ABSTRACT

A composition comprising calcined gypsum, trimetaphosphate ion, and a water-soluble linear polymer formed by the addition reaction of ethylene oxide and/or alkoxy-substituted ethylene oxide with water, having enhanced strength when set and exhibiting high plasticity and workability such that it readily can be applied to a substrate, is disclosed.

43 Claims, No Drawings ns and products. More particularly, the invention
HIGH-STRENGTH JOINT COMPOUND

TECHNICAL FIELD OF THE INVENTION

The present invention relates generally to gypsum-related compositions and products. More particularly, the invention relates to a composition comprising calcined gypsum that is capable of setting on a substrate, and which is useful as a joint compound.

BACKGROUND OF THE INVENTION

Joint compounds are well-known materials that are used commonly to fill and smooth the joints between abutting edges of two adjacent gypsum boards. Typically, such joint compounds are plaster materials that include water, calcined gypsum and other components such as, for example, fillers, thickeners, set control additives, binders, and the like, as desired to form a workable viscous slurry. The joint compound typically is applied to the joint between two adjacent wallboards, often over a tape or mesh support. As the joint compound is applied, it is typically smoothed over the joint between the two wallboards and it is feathered over at least a portion of each of the two pieces of wallboard to hide the joint and present to the eye a uniform one-piece appearance. Quite often, several applications of the joint compound are required to achieve the desired effect.

The joint compound is allowed to set and dry after each coat. During the setting and drying process, the calcined gypsum reacts with the water to form a matrix of hydrated gypsum or calcium sulfate dehydrate crystals. It is the desired hydration of the calcined gypsum that enables the formation of an interlocking matrix of set gypsum crystals, thereby imparting strength to the gypsum structure in the applied joint compound. After the joint compound is set and dried, the composite surface structure is typically decorated so as to create the appearance of a uniform continuous wall surface.

There is a continuing need for a joint compound with enhanced strength, both its "green" strength and "final" strength. Green strength refers to the strength of the joint compound after setting but while it is still wet, while final strength refers to the strength of the joint compound after it has set and dried. For example, there is an increasing demand in the marketplace for homes manufactured on an assembly line in a factory and transported to its final destination. There is a need for joint compounds used to join adjacent pieces of wallboard used in the manufacture of the walls, ceilings and even flooring of such homes that exhibit sufficient strength to withstand flexing and other stresses encountered on the manufacturing line during handling after manufacture. In addition, the final strength of the joint compound is particularly important as the manufactured home is transported to the homesite, where it is subjected to various stresses, such as lifting in order to place the home in its final location. Final strength of the joint compound also is important during the use-life of the final wall product, for example, to avoid cracking.

However, providing a joint compound with enhanced green strength or final strength, while also maintaining sufficient plasticity, has proven to be difficult. In this respect, plasticity is the property of plaster that permits permanent and continuous deformation in any direction. As opposed to low viscosity materials, joint compounds require a measurable force to initiate flow. A material of low plasticity is usually described as being "poor" or hardworking; high plasticity is described in terms of being "rich" or easy working. Previous attempts to provide a joint compound with enhanced strength have not been fully satisfactory because, as strength is enhanced, the plasticity or workability of the joint compound generally is diminished such that the joint compound is not as easily applied to the desired substrate.

Accordingly, it will be appreciated from the foregoing that there is a need in the art for a joint compound that exhibits enhanced green and/or final strength, while also maintaining sufficient workability for application to a substrate, such as the joint between two wallboards.

BRIEF SUMMARY OF THE INVENTION

The present invention provides a composition which, after it is set but still wet, exhibits enhanced green strength and/or after setting and drying exhibits enhanced final strength. The composition of the invention comprises calcined gypsum, trimetaphosphate ion, and a water-soluble linear polymer formed by the addition reaction of ethylene oxide and/or alkoxy-substituted ethylene oxide with water. The composition may include water or it may be dry as formed and then mixed with water to form a slurry of desired consistency and workability prior to application. The composition has a pH of about 9 or less upon the addition of water thereto. When water is added, the composition of the invention has a water to calcined gypsum ratio of from about 100:100 to about 18.6:100. Calcium sulfate alpha hemihydrate has been found to be particularly useful in the practice of the invention. The composition also can include additives such as thickeners, binders, set control additives, and the like so long as the composition has a pH of about 9 or less.

Advantageously, the composition of the invention exhibits enhanced strength, particularly green strength and/or final strength. At the same time, the composition of the invention displays sufficient plasticity and workability such that the composition can be applied with relative ease to a substrate, such as the joint between two wallboards, as well as to the wallboards themselves. As such, the composition and joint compound of the invention can be used to fill and smooth the joints between two wallboards. The invention is useful in any type of building construction and it is particularly useful for homes built in a factory on an assembly line and transported to a homesite. In particular, the composition displays significant green strength to withstand various stresses found in assembly line manufacture of homes and in the handling and transport of pre-fabricated walls, ceilings and flooring. The composition also demonstrates significant final strength to withstand stresses encountered during the construction process at the final building site, independent of the type of construction process or building, and during the use-life of the set composition, for example, so as to minimize cracking.

These and other advantages of the present invention, as well as additional inventive features, will be apparent from the description of the invention. The invention may best be understood with reference to the following detailed description of the preferred embodiments.

DETAILED DESCRIPTION OF THE PREFERRED EMBODIMENTS

The present invention provides a calcined gypsum-containing composition which, after it has set but is still wet, exhibits enhanced green strength and/or after setting and drying exhibits enhanced final strength. The composition also exhibits desirable qualities such as plasticity and workability to facilitate its application. Thus, the composition is particularly useful as a joint compound. It will be appreciated that the composition requires water in use in order to allow it to be applied to a substrate such as to a joint between two abutting pieces of wallboard, ceiling tile, flooring, or the like. Thus, it is contemplated that the composition of the present invention can be provided dry, that is, essentially free of water, or wet, that is, with water included in the composition as formed. The composition of the present invention comprises calcined gypsum, trimetaphosphate ion, and a water-soluble linear polymer formed by the addition reaction of ethylene oxide and/or alkoxy-substituted ethylene oxide with water. Whether water is included in the composition as made, or whether water is added to the dry form of the composition of the invention in order to facilitate application of the composition, sufficient water is included to form a viscous and workable slurry. In accordance with the present invention, the components of the composition of the invention are selected so the composition in conjunction with water has a pH of about 9 or less.

The composition can be used, for example, as a joint compound to fill and smooth the joint between edges of two wallboards, ceiling tile, flooring or the like. In the practice of the invention, the composition is compatible with any of a variety of types of wallboard, ceiling tile or flooring used in any of a variety of types of buildings and construction processes. For example, the composition can be used as a joint compound for manufactured homes built in a factory on an assembly line, or with homes and buildings built directly on site.

Regardless of the building type or construction process for which the composition of the invention is used, a workable and viscous slurry in accordance with the invention is applied and smoothed out in the joint between two abutting substrates, such as two abutting wallboards. After the slurry is applied and smoothed in the joint, the composition of the invention is allowed to set and harden. Preferably, the set composition and the substrates are decorated so as to form a smooth and monolithic continuous appearance.

In accordance with the present invention, the composition of the invention exhibits enhanced green and/or final strength, and the wet composition desirably is in a workable form of high plasticity. To enhance strength, the composition includes a trimetaphosphate ion. It has been found desirable to maintain the composition at a pH below about 9 in order to realize the full benefit of the trimetaphosphate ion, as the trimetaphosphate ion has been found to be unstable at higher alkaline levels. As a result, components in addition to the trimetaphosphate ion that are included in the composition are selected so that they function at a pH below about 9. In addition, various components commonly used in conventional joint compounds, such as lime, which raise the pH of the composition above a pH of about 9, are preferably avoided pursuant to the present invention.

In addition, the ingredients included in the composition are selected so that they require as little water as possible to function, that is, that they have as low of a water demand as possible. In some cases, selected components such as, for example, plaster dispersants or water reducing additives, preferably reduce the water demand of the composition. Increasing the water demand of the composition is undesirable because the greater the amount of water that is in the composition, the lower the density of the resultant set gypsum product due to an increase in the void volume, e.g., air space, present in the interlocking matrix of set gypsum. Lower density, high void volume set gypsum has a greater predisposition for forming failure points. Thus, the greater the void volume present in the interlocking set gypsum structure, the greater the risk that, for example, a fissure or other type of crack can propagate through the set joint compound.

While the inventive composition after setting exhibits enhanced green and/or final strength, it maintains sufficient workability and plasticity while wet to facilitate its application to the substrate, and in particular to a joint between two abutting wallboards, ceiling tiles, flooring materials and the like. The composition can have any desired consistency and viscosity so long as it can be applied to a substrate, although the viscosity must be great enough that the composition does not run or drip excessively when applied, but not so great that it is too thick to be applied, as is known in the art. By way of example, the composition can have a use consistency of from about 17.3 to about 100 cubic centimeters water per 100 grams of dry material (including calcined gypsum and any other dry components that are present), preferably a use consistency of from about 17.3 to about 40 cubic centimeters water per 100 grams dry material, and more preferably, a use consistency of from about 17.3 to about 30 cubic centimeters per 100 grams dry material. For example, in some embodiments, the composition can have a use consistency of from about 24 to about 30 cubic centimeters water per 100 grams of dry material.

In some embodiments, the composition has a hand application viscosity of from about 200 Brabender to about 800 Brabender at the use consistency of between about 17.3 and about 40 cubic centimeters per 100 grams of dry material, preferably a hand application viscosity of from about 450 Brabender to about 550 Brabender at the use consistency of between about 24 and about 30 cubic centimeters per 100 grams of dry material.

The calcined gypsum used in the composition of the present invention can be in the form of calcium sulfate alpha hemihydrate, calcium sulfate beta hemihydrate, water-soluble calcium sulfate anhydride, or combinations thereof. In the wet form of the composition of the present invention, the ratio of water to calcined gypsum in the composition of the invention is from about 100:100 to about 18.6:100, preferably from about 40:100 to about 18.6:100, more preferably from about 35:100 to about 18.6:100, even more preferably, from about 30:100 to about 18.6:100, and still more preferably, from about 30:100 to about 24:100. Preferably, the water is present in the slurry in an amount ranging from about 14% to about 50% by weight of the wet composition, more preferably, in an amount ranging from about 19% to about 23% by weight of the wet composition.

The composition of the present invention is preferably comprised of calcium sulfate alpha hemihydrate. The crystal morphology of calcium sulfate alpha hemihydrate facilitates wetting and a higher level of dispersion when mixed with reduced levels of water as compared to compositions made with calcium sulfate beta hemihydrate. It is believed that the less acicular shape of the calcium sulfate alpha hemihydrate, as compared with the needle-like shape of the beta hemihydrate, contributes to the wetting and flow characteristics of the preferred compositions. It is also believed that the lower water demand of the calcium sulfate alpha hemihydrate results in a more closely packed, higher density interlocking matrix of set gypsum, in comparison to the interlocking matrix of set gypsum resulting from the setting of calcium sulfate beta hemihydrate. However, the beta or anhydride forms of calcium sulfate hemihydrate also can be used pursuant to the present invention, alone or in a blend with the alpha form, particularly where consistency reducers are utilized as will be appreciated by one of ordinary skill in the art.

The calcined gypsum can be included in the composition in any suitable amount. Preferably, the calcined gypsum is present in an amount ranging from about 50% to about 93% by weight of the dry composition (i.e., prior to addition of the water), more preferably, from about 90% to about 93% by weight of the dry composition. In the wet composition, the calcined gypsum preferably is present in an amount ranging from about 25% to about 78% by weight of the wet composition (i.e., after water is added to form a slurry), more preferably, from about 45% to about 78% by weight of the wet composition.

In accordance with the present invention, a trimetaphosphate salt is included in the dry composition of the invention in order to enhance the strength of the composition, particularly after setting. Of course, when the composition is made or mixed with water, the trimetaphosphate salt forms a trimetaphosphate ion. The trimetaphosphate salt has a cyclic structure that contains three phosphorus atoms in a six-membered ring. While not wishing to be bound by any particular theory, it is believed that the cyclic trimetaphosphate structure has a surface affinity for the gypsum crystals as the interlocking matrix of set gypsum forms during setting. In this respect, it is believed that the trimetaphosphate ion adsorbs to the gypsum crystal surface and interlocks therewith, so as to prevent the natural tendency of the gypsum crystals to creep or flow, for example, as the material is exposed to heat or as it absorbs ambient moisture. As such, the trimetaphosphate ion is believed to act as a reinforcing material that prevents gypsum crystals from sliding against each other under strain. Importantly, it has been found that the reinforcing character of trimetaphosphate ion is effective so long as the pH of the wet composition is maintained below about 9. If the pH of the composition exceeds about 9, the trimetaphosphate creates a retardive effect on the hydration reaction of the calcium sulfate hemihydrate thereby negatively affecting crystal development and, thus, negatively impacting crystal matrix strength development. Preferably, the composition has a pH of about 8 or less.

The trimetaphosphate ion in the wet form of the composition can be provided by any suitable trimetaphosphate salt, including double salts, that is, trimetaphosphate salts having two cations. Trimetaphosphate salts suitable for use in the composition of the present invention include sodium trimetaphosphate, potassium trimetaphosphate, calcium trimetaphosphate, sodium calcium trimetaphosphate, ammonium trimetaphosphate, aluminum trimetaphosphate, lithium trimetaphosphate, and the like. The trimetaphosphate can be used alone or in various combinations. Sodium trimetaphosphate is preferred. The trimetaphosphate salt is included in the dry composition in any suitable amount, and correspondingly, the trimetaphosphate ion is provided in the wet composition in any suitable amount, provided that the enhanced green strength and/or final strength is achieved. For example, the trimetaphosphate salt can be included in the dry composition in an amount of from about 0.025% to about 0.5% by weight of the dry composition, and, preferably in an amount of from about 0.15% to about 0.3% by weight of the dry composition. Similarly, the trimetaphosphate ion can be provided in an amount of from about 0.013% to about 0.43% by weight of the wet composition. Preferably, the trimetaphosphate ion is present in an amount of from about 0.075% to about 0.26% by weight of the wet composition.

The water-soluble linear polymer formed by the addition reaction of ethylene oxide and/or alkoxy-substituted ethylene oxide with water is provided in accordance with the present invention to enhance the workability of the composition and to provide a composition with satisfactory plasticity. In this respect, as the solids content and density of the gypsum are increased in order to increase the strength of the set composition, the workability of the wet composition can be negatively impacted. As such, the water-soluble linear polymer is added to the composition to counter balance the enhanced solids content such that the user readily can apply the composition, such as, for example, as it is used as a joint compound.

The water-soluble linear polymer desirably has a waxy nature, which enhances the lubricity of the composition and improves its workability in a similar fashion to the use of a thickening agent. The water-soluble linear polymer is preferably formed by the addition reaction of ethylene oxide and/or alkoxy-substituted ethylene oxide with water. The water-soluble linear polymer can be unsubstituted or substituted with various organic groups so long as it has the waxy characteristic to impart lubricity to the composition. Preferably, the water-soluble linear polymer has an average molecular weight of from about 4,000 daltons to about 20,000 daltons, more preferably from about 6,000 daltons to about 10,000 daltons (e.g., about 8,000 daltons). Glycols, such as, for example, polyethylene glycol, methoxy polyethylene glycol, a copolymer thereof, or a blend thereof, are preferred, but other water-soluble linear polymers can be utilized in accordance with the present invention.

The water-soluble linear polymer can be provided in any suitable amount. For example, the water-soluble linear polymer can be included in the dry composition in an amount of from about 0.025% to about 1% by weight of the dry composition, and, preferably, in an amount of from about 0.25% to about 0.50% by weight of the dry composition. In the wet composition, the water-soluble linear polymer can be provided, for example, in an amount of from about 0.05% to about 1% by weight of the wet composition, more preferably, from about 0.40% to about 0.75% by weight of the wet composition.

The composition of the invention also can include other optional ingredients, as desired. For example, preferably, the composition also includes a thickening agent. After water is added to the composition, the thickener becomes hydrated and swells, thereby creating a thickening effect to the composition. Thickeners are useful, for example, in helping to create the body and flow properties commonly associated with joint compounds. Desirably, the thickener is selected so that it substantially hydrates during the mixing process after water is added to the composition, with little or no hydration of the thickener occurring after mixing is completed. As a result, the thickener preferably is not surface-treated. Although surface-treated thickeners can be added directly to aqueous systems, whereas non-surface treated thickeners require thorough dry dispersion prior to mixing with water in order to prevent the formation of lumps in the joint compound, surface-treated thickeners undesirably undergo delayed hydration. Since, pursuant to the present invention, the thickener preferably is selected so as to minimize any "delayed hydration," such surface treated thickeners preferably are avoided. Thickeners that undergo delayed hydration are less desirable pursuant to the invention because such thickeners generally require raising the pH of the composition above 9 to cause the thickening effect to occur timely (i.e., preferably during the mixing process). The thickener also is selected such that the amount of it required is minimized and so that it requires a minimum amount of water for it to be hydrated so as to minimize the negative effect on the strength of the resultant set gypsum product caused by the presence of the thickener and void volume (caused by the evaporation of water) within the gypsum matrix.

Any suitable thickening agent operable as described herein can be utilized in accordance with the present invention. By way of example, the thickening agent can be selected from methylcellulose, hydroxyethylcellulose, hydroxypropylmethylcellulose, methylhydroxypropylcellulose, cellulose-based gums, such as xanthan, arabic, alginate, pectin and guar gums. One thickening agent can be used in the practice of this invention or any combination of thickening agents can be used. A preferred thickener is a non-surface treated low viscosity-thickening agent, e.g., 3800 mPa*s as measured by a Brookfield RVT, 20 RPM, 2% thickener in water.

The thickening agent can be provided in any suitable amount. In some embodiments, the thickening agent is present in the dry composition in an amount of from about 0% to about 0.4% by weight, and, more preferably, in an amount of from about 0% to about 0.2% by weight of the dry composition. In the wet composition, the thickening agent can be provided in an amount ranging, for example, from about 0% to about 0.34% by weight, preferably from about 0% to about 0.17% by weight of the wet composition.

The composition desirably also includes a binder which enhances adhesion of the composition to the substrate, such as wallboard. Desired binders in accordance with the present invention do not increase water demand, and preferably, reduce water demand of the composition. Any suitable binder that does not increase water demand, and which is compatible with the composition of the invention and the substrate to which the composition is applied, can be utilized. For example, the binder can be selected from polyvinyl acetates, acrylics, alcohols (e.g., polyvinyl alcohol), ethylene vinyl acetates, vinyl versatates, vinyl chlorides, styrene acrylics, and the like, or combinations thereof. The binder can be present in any suitable amount, such as, for example, in an amount ranging from about 0.025% to about 3.5% by weight of the dry composition, preferably from about 1% to about 3% by weight of the dry composition. In the wet composition, the binder can be present, for example, in an amount of from about 0.013% to about 3% by weight of the wet composition, preferably, from about 0.50% to about 2.6% by weight of the wet composition.

Other additives, as will be appreciated by one of ordinary skill in the art, likewise can be included in the composition of the invention. In keeping with the invention, the additives are selected to function at a pH of about 9 or less to avoid increasing the pH of the composition above a pH of 9 in a wet composition, and to minimize water demand to the extent possible. For example, the composition can include a filler, as is known in the art. Suitable fillers include, for example, mica; talcs such as sericite or diatomaceous earth; clays such as attapulgite, sepulite and kaolin; calcium sulfate dehydrate; perlite; or the like; and combinations thereof. The filler can be provided in any suitable amount, such as, for example, in an amount of from about 0% to about 20% by weight of the dry composition, preferably, from about 0% to about 5% by weight of the dry composition. In the wet composition, the filler can be provided, for example, in an amount ranging from about 0% to about 17% of the wet composition, more preferably, in an amount of from about 0% to about 4.3% by weight of the wet composition.

In addition, set control additives optionally can be included in the composition. Exemplary set control additives that can be utilized in accordance with the present invention, include, but are not limited to, potassium sulfate, calcium sulfate, aluminum sulfate, boric acid, proteinaceous retarders, sodium citrate, citric acid, tartrates, or the like, or combinations thereof. As is known to those skilled in the art, the level and combination of set control additives is dependent on the overall desired hydration time and hydration rate of the joint compound to be made. The set control additive can be provided in any suitable amount, but it is preferable to minimize the level in some embodiments because the set control additive often has a negative effect on strength. For example, to maintain strength, the total amount of set control additives preferably is less than about 0.5% by weight of the dry composition, more preferably, less than about 0.15% by weight of the dry composition.

Optionally, a cross-linking inhibitor also can be utilized to inhibit cross-linking of certain binders, for example, alcohols such as polyvinyl alcohol, to the substrate. For example, during the manufacture of wallboard, such as SHEETROCK®, commercially available from USG Corporation, often borates or boric acid are added to enhance manufacture and/or to enhance board properties. However certain binders, such as alcohols (e.g., polyvinyl alcohol), can react undesirably with the borates or boric acid in the wallboard to minimize workability of the composition of the invention during application of the composition to a joint. Thus, in some embodiments, the cross-linking inhibitor is utilized to prevent or minimize unwanted cross-linking of the binder with the borates and/or boric acid in the wallboard. Any suitable binder cross-linking inhibitor can be utilized in accordance with the present invention. Preferably, sugar alcohols (polyols), such as sorbitol, are utilized. The binder cross-linking inhibitor can be provided in any suitable amount, such as, for example, in an amount ranging from about 0% to about 1% by weight of the dry composition, preferably, in an amount ranging from about 0% to about 0.5% by weight of the dry composition. In the wet composition, the binder cross-linking inhibitor can be present, for example, in an amount ranging from about 0% to about 0.85% by weight of the wet composition, preferably, in an amount ranging from about 0% to about 0.43% by weight of the wet composition. As will be appreciated by those skilled in the art, biocides (e.g., Vancide, commercially available from R.T. Vanderbuilt) optionally can be included in the joint compound.

It will be understood by those of ordinary skill in the art that specific additive ranges are interdependent such that one could not feasibly add the maximum amount of each additive stated in each additive range described herein. The amount of each additive can be varied depending on the specific properties sought. By way of illustration only, to ease the sanding burden, one would add a percentage of calcium carbonate filler while at the same time reducing the percentage of calcium sulfate hemihydrate.

Desirably, the composition of the invention exhibits enhanced strength, for example, in terms of green strength and/or final strength. Preferably, the composition of the invention exhibits a compressive strength of at least about 2,000 psi at one hour after set, more preferably, a compressive strength of at least about 2,500 psi at one hour after set. As such, the composition of the invention exhibits sufficient strength to withstand flexing and various other stresses encountered during assembly line manufacture. For example, the enhanced green strength avoids cracking or the like at the joint when large sections of wallboard, ceiling, or floor are moved through the assembly line or off the assembly line for drying. In addition, the composition exhibits a final compressive strength of at least about 5,000 psi after set and drying. More preferably, the composition exhibits a compressive strength of at least about 5,500 psi after set and drying. As such, the composition desirably exhibits sufficient final strength to withstand various stresses during transportation to the final homesite, during construction at the final homesite, and/or during the life of the final wall product.

The following examples further illustrate the present invention but should not be construed as in any way limiting its scope. In the Examples, "NaTMP" stands for sodium trimetaphosphate.

EXAMPLE 1

WORKABILITY

This Example shows the enhanced workability of a joint compound according to the invention as compared with other joint compounds.

In particular, four joint compounds were prepared by dry blending the solid ingredients for 20 minutes in a PK Blender. The four formulations, identified as formulations A–D, are provided in Table 1. The indicated amounts are in grams.

TABLE 1

Formulations A–D

| Ingredient | Type of Additive | A | B | C | D |
|---|---|---|---|---|---|
| Calcium sulfate alpha hemihydrate (Hydrocal C-Base) | Calcium sulfate alpha hemihydrate | 1854.91 | 1854.91 | 1854.91 | 1854.91 |
| Mica (Mica P-80F) | filler | 50.82 | 50.82 | 50.82 | 51.16 |
| Melamine-formaldehyde sodium-bisulfite polymer (Melement F17G) | consistency reducing dispersant | 0.00 | 0.00 | 0.00 | 3.72 |
| NaTMP | strength enhancer | 0.00 | 0.00 | 0.00 | 2.33 |
| Methylcellulose ether (F4M) | non-surface treated delayed hydrating thickener | 4.10 | 4.10 | 4.10 | 3.72 |
| Attapulgite clay (Super Gel B) | clay filler | 38.11 | 38.11 | 38.11 | 32.56 |
| Vinyl acetate/ ethylene copolymer (Glass Transition Temp. = 7° C.) (Airflex RP-226) | binder | 33.00 | 0.00 | 0.00 | 0.00 |
| Vinyl acetate/ ethylene copolymer (Glass Transition Temp. = 3° C.) (Elotex 50E200) | binder | 0.00 | 33.00 | 0.000 | 33.00 |
| Vinyl acetate/ ethylene/vinyl chloride terpolymer (Glass Transition Temp. = 5° C.) (Airflex RP-228) | binder | 0.00 | 0.00 | 33.00 | 0.00 |

TABLE 1-continued

Formulations A–D

| Ingredient | Type of Additive | A | B | C | D |
|---|---|---|---|---|---|
| PEG 8000 | polyethylene glycol having an avg. mw of 8000 | 0.00 | 0.00 | 0.00 | 27.91 |
| Ammonium Tartrate | set control additive | 0.00 | 0.00 | 0.00 | 2.33 |
| Sodium potassium tartrate tetrahydrate (Rochelle Salt) | set control additive | 0.00 | 0.00 | 0.00 | 2.79 |
| Methylcellulose Ether surface treated (Methocel 228) | delayed hydrating thickener | 0.00 | 0.00 | 0.00 | 0.00 |
| D-Glucitol (Sorbitol) | binder cross-linking inhibitor | 4.07 | 4.07 | 4.07 | 3.72 |
| Ivory Lime | pH elevator | 0.00 | 0.00 | 0.00 | 0.00 |
| Potassium Sulfate | accelerator/set stabilizer | 5.00 | 5.00 | 5.00 | 7.44 |
| Proteinaceous retarder (Industria Suma) | set control additive | 0.30 | 0.30 | 0.30 | 0.30 |
| Citric Acid | set control additive | 0.24 | 0.24 | 0.20 | 0.20 |
| Total | — | 1990.6 | 1990.6 | 1990.5 | 1998.6 |

300 g of each of the formulations was then added to a sufficient amount of water to form a consistency of between 27 and 30 cubic centimeters of water per 100 grams of dry material, as specified in Table 2. In mixing the dry material with water, the mixing was performed by hand for two minutes.

The viscosity of each slurry formulation was measured on a Brabender Viscorecorder, and the workability of the slurry compound was observed. Formulations A–D also were compared with a control formulation, namely, SHEET-ROCK® MH Brand Setting Type Joint Compound TUF SET™ HES, commercially available from United States Gypsum Company. Table 2 provides the consistency, viscosity, and workability observations of each of the formulations.

TABLE 2

Consistency, Viscosity and Workability of Formulations A–D

| Effect | Control | A | B | C | D |
|---|---|---|---|---|---|
| Consistency (cc/100 g) | 31 | 30 | 27 | 27 | 27 |
| Viscosity (Brabender Units) | 310 | 550 | 520 | 580 | 580 |
| Workability Observation | Heavy, Broke Down | Heavy, Loose | Heavy, Broke Down | Heavy, Craters | Thick, good slip |

As seen in Table 2, the joint compound D, which contained both polyethylene glycol (average molecular weight of 8,000) and trimetaphosphate, exhibited superior workability as compared with the other formulations (including the control), none of which included polyethylene glycol and trimetaphosphate, while also exhibiting desired viscosity and consistency.

EXAMPLE 2

COMPRESSIVE STRENGTH

This Example demonstrates the enhanced strength provided by the joint compound of the invention.

Particularly, eight joint compounds were prepared by dry blending the ingredients according to the process described in Example 1. The formulations, which are identified as formulations E–L, are set forth in Table 3, wherein the amounts provided are in grams.

In accordance with ASTM C472, each of the slurry samples was cast into a mold to prepare a cube (2 inches per side). Six cube samples were prepared from each formulation. One hour after curing, three of the six cubes from each formulation were removed from the mold to permit measurement of wet density and wet strength. Wet density (in pounds per cubic foot) was determined by weighing the cube and multiplying the weight by a factor of 0.476. The wet compressive strength was measured on a SATEC testing machine. The vicat set (minutes) was determined using a 300 g vicat needle, pursuant to ASTM-472.

TABLE 3

| | Formulations E–L | | | | | | | |
|---|---|---|---|---|---|---|---|---|
| Ingredient | E | F | G | H | I | J | K | L |
| Calcium sulfate alpha hemihydrate (Hydrocal C-Base) | 3710 | 3710 | 3710 | 3710 | 3710 | 3710 | 3710 | 3710 |
| Mica (Mica P-80F) | 102 | 102 | 102 | 102 | 102 | 102 | 102 | 102 |
| Melamine-formaldehyde sodium-bisulfite polymer (Melement F17G) | 0 | 4 | 0 | 4 | 0 | 4 | 0 | 4 |
| NaTMP | 9 | 9 | 9 | 9 | 9 | 9 | 9 | 9 |
| PEG 8000 | 0 | 0 | 0 | 0 | 10 | 10 | 10 | 10 |
| Methylcellulose Ether surface treated (Methocel-228) | 0 | 0 | 8 | 8 | 0 | 0 | 8 | 8 |
| Attapulgite Clay (Super Gel B) | 76 | 76 | 76 | 76 | 76 | 76 | 76 | 76 |
| Vinyl acetate/ethylene copolymer (Glass Transition Temp. = 3° C. (Elotex 50E200) | 66 | 66 | 66 | 66 | 66 | 66 | 66 | 66 |
| D-Glucitol (Sorbitol) | 8 | 8 | 8 | 8 | 8 | 8 | 8 | 8 |
| Potassium Sulfate | 16 | 16 | 16 | 16 | 16 | 16 | 16 | 16 |
| Proteinaceous retarder (Industria Suma) | .70 | .70 | 0.70 | 0.70 | 0.70 | 0.70 | 0.70 | 0.70 |
| Citric Acid | 0.50 | 0.50 | 0.50 | 0.50 | 0.50 | 0.50 | 0.50 | 0.50 |
| Total | 3988.2 | 3992.2 | 3996.2 | 4000.2 | 3998.2 | 4000.2 | 4006.2 | 4010.2 |

In mixing 2000 grams of dry material with water, the mixing was done continuously for two minutes using a standard HOBART mixer equipped with a paddle and set at speed 1. After two minutes, mixing was stopped to ensure that no dry material adhered to the mixing blades, and then mixing was continued for an additional minute. Each sample formulation was combined with a sufficient amount of water to form a slurry having a consistency of 27 cc water per 100 g dry material, except for formulation E, which had a The other three cubes for each formulation consistency were removed from the molds and dried in a ventilated oven at 112° F. for at least 72 hours or until their weight stopped changing. The dry density and dry strength were determined as described above with respect to the wet density and wet strength.

The results are reported in Table 4. Each of the compressive strength and density values refers to an average of three tested samples.

TABLE 4

Formulations E–L at a Consistency of 25 or 27 cc water/100 g Dry Material

| Effect | E | F | G | H | I | J | K | L |
|---|---|---|---|---|---|---|---|---|
| Consistency (cc/100 g) | 25 | 27 | 27 | 27 | 27 | 27 | 27 | 27 |
| Vicat Set (minutes) | 32 | 43 | 40 | 54 | 50 | 83 | 48 | 60 |
| Viscosity (Brabender Units) | 740 | 320 | 320 | 640 | 360 | 320 | 660 | 600 |
| Wet Density (pcf) | 117.98 | 113.35 | 106.96 | 109.17 | 714.73 | 705.65 | 663.58 | 668.45 |
| Wet Strength (psi) | 3207 | 2590 | 1794 | 2113 | 2570 | 2482.37 | 1937 | 1709 |
| Dry Density (pcf) | 103.87 | 103 | 93.73 | 98.07 | 103.80 | 103.84 | 95.76 | 98.5 |
| Dry Strength (psi) | 6728 | 6363 | 4811 | 5114 | 5939 | 5717 | 4928 | 4562 |

As seen in Table 4, the joint compounds including sodium trimetaphosphate exhibit superior green (wet) and final strength. Table 4 also reveals that levels of methylcellulose ether tend to reduce strength. None of the formulations in Table 4 included lime and their pH was less than 9.

EXAMPLE 3 (COMPARATIVE EXAMPLE)

For comparative purposes, the joint compound commercially available as SHEETROCK® MH Brand Setting Type Joint Compound TUF-SET™ HES 45 (United States Gypsum Company) also was evaluated. This product does not contain sodium trimetaphosphate or polyethylene glycol and is considered in the art to be a setting type joint compound with high early strength. The product has a pH above 9.0.

The SHEETROCK® MH Brand Setting Type Joint Compound TUF-SET™ HES 45 formulation was added to water at a consistency of 27 cc water/100 g dry material. At this consistency, the viscosity was measured to be 480 Brabender units. The vicat set time was measured to be 58 minutes. Three two-inch cube samples were tested with respect to dry density and dry strength. The average wet density was 104.65 pcf; the average wet strength was 1594.66 psi, the average dry density was 95.33 pcf; and the average dry strength was 5034 psi.

As seen by comparing Examples 2 and 3, embodiments according to the invention can provide enhanced strength, particularly at lower consistencies. For example, Formulations I and J of Example 2, which include PEG and NaTMP exhibit a wet compressive strength of 2,570 and 2,482.37, respectively, at a consistency of 27 cc water/100 g dry material, as compared with the SHEETROCK® MH Brand Setting Type Joint Compound TUF-SET™ HES, which has a wet strength of only 1,594.66 at the same consistency. Furthermore, Formulations I and J exhibit a dry compressive strength of 5,939 and 5,717, respectively, as compared with the SHEETROCK® MH Brand Setting Type Joint Compound, TUF-SET™ HES, which exhibits a dry compressive strength of 5,034.

All of the references cited herein, including patents, patent applications, and publications, are hereby incorporated in their entireties by reference.

While this invention has been described with an emphasis upon preferred embodiments, it will be understood by those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A composition comprising:
   water;
   calcined gypsum;
   trimetaphosphate ion; and
   a water-soluble linear polymer formed by addition reaction of ethylene oxide and/or alkoxy-substituted ethylene oxide with water, wherein said composition has a pH of about 9 or less, and wherein the weight ratio of water to calcined gypsum in said composition is from about 100:100 to about 18.6:100.

2. The composition of claim 1, wherein the trimetaphosphate ion is provided by a trimetaphosphate salt selected from the group consisting of sodium trimetaphosphate, potassium trimetaphosphate, calcium trimetaphosphate, sodium calcium trimetaphosphate, lithium trimetaphosphate, and combinations thereof.

3. The composition of claim 1, wherein the trimetaphosphate ion is present in an amount of from about 0.025% to about 0.5% by weight of said composition.

4. The composition of claim 3, wherein the trimetaphosphate ion is present in an amount of from about 0.15% to about 0.3% by weight of said composition.

5. The composition of claim 1, wherein the water-soluble linear polymer formed by the addition reaction comprises polyethylene glycol, methoxypolyethylene glycol, a blend thereof, or a copolymer thereof.

6. The composition of claim 1, wherein the water-soluble linear polymer has an average molecular weight of from about 4,000 daltons to about 20,000 daltons.

7. The composition of claim 6, wherein the water-soluble linear polymer has an average molecular weight of from about 6,000 daltons to about 10,000 daltons.

8. The composition of claim 1, wherein the water-soluble linear polymer is present in an amount of from about 0.025% to about 1% by weight of said composition.

9. The composition of claim 8, wherein the water-soluble linear polymer is present in an amount of from about 0.25% to about 0.50% by weight of said composition.

10. The composition of claim 1, wherein said composition further comprises a thickening agent.

11. The composition of claim 10, wherein said thickening agent is selected from the group consisting of hydroxyethyl cellulose, methyl cellulose, hydroxypropylmethyl cellulose, methylhydroxypropyl cellulose, cellulose based gums, and combinations thereof.

12. The composition of claim 10, wherein the thickening agent is present in an amount of from about 0% to about 0.5% by weight of said composition.

13. The composition of claim 10, further comprising a binder that reduces the water demand of said composition.

14. The composition of claim 1, further comprising a binder that reduces the water demand of said composition.

15. The composition of claim 14, wherein the binder is selected from the group consisting of a polyvinyl acetate, an acrylic, an alcohol, an ethylene vinyl acetate, a vinyl versatate, a vinyl chloride, a styrene acrylic, and combinations thereof.

16. The composition of claim 14, wherein the binder is present in an amount of from about 0.025% to about 3.5% by weight of said composition.

17. The composition of claim 14, wherein the binder is present in an amount of from about 1% to about 3% by weight of the said composition.

18. The composition of claim 1, wherein said composition has a pH of about 8 or less.

19. The composition of claim 1, further comprising at least one filler.

20. The composition of claim 18, wherein the filler is selected from the group consisting of a clay, mica, a talc, perlite, calcium sulfate dehydrate, and combinations thereof.

21. The composition of claim 1, wherein said composition has a hand application viscosity of from about 200 Brabender to about 800 Brabender at a use consistency of between about 18.6 and about 40 cubic centimeters water per 100 grams of dry material.

22. The composition of claim 1, wherein said composition has a hand application viscosity of from about 450 Brabender to about 550 Brabender at a use consistency of between about 24 and about 30 cubic centimeters water per 100 grams of dry material.

23. The composition of claim 1, further comprising at least one set control additive.

24. The composition of claim 23, wherein said set control additive is selected from the group consisting of potassium sulfate, calcium sulfate, aluminum sulfate, boric acid, a proteinaceous retarder, sodium citrate, citric acid, a tartrate, and combinations thereof.

25. The composition of claim 1, wherein said calcined gypsum comprises calcium sulfate alpha hemihydrate.

26. A joint compound comprising the composition of claim 1, wherein said calcium sulfate alpha hemihydrate forms a set gypsum matrix when applied to a substrate.

27. The joint compound of claim 26, wherein said joint compound exhibits a compressive strength of at least about 2,000 psi at 1 hour after set.

28. The joint compound of claim 26, wherein said joint compound exhibits a compressive strength of at least about 5,000 psi after set and complete drying.

29. A joint compound comprising the composition of claim 14, wherein said calcium sulfate alpha hemihydrate forms a set gypsum matrix when applied to a substrate.

30. The joint compound of claim 29, wherein said composition further comprises a binder cross-linking inhibitor for inhibiting cross-linking of said binder to said substrate.

31. The joint compound of claim 30, wherein said binder cross-linking inhibitor comprises D-glucitol.

32. The joint compound of claim 30, wherein said binder is present in an amount from about 0% to about 1% by weight of said compound.

33. The joint compound of claim 30, wherein said binder cross-linking inhibitor is present in an amount of from about 0% to about 0.5% by weight of said compound.

34. A composition comprising:

water;

calcium sulfate alpha hemihydrate;

trimetaphosphate ion; and polyethylene glycol, wherein said composition has a pH of about 9 or less.

35. A joint compound comprising:

water;

calcium sulfate alpha hemihydrate;

trimetaphosphate ion;

polyethylene glycol;

thickener;

binder; and set control additive, wherein said composition has a pH of about 9 or less.

36. A joint compound comprising calcium sulfate alpha hemihydrate, trimetaphosphate ion, and a water-soluble linear polymer formed by addition reaction of ethylene oxide and/or alkoxy-substituted ethylene oxide with water, wherein said composition has a pH of about 9 or less upon addition of water thereto.

37. The composition of claim 36, wherein the trimetaphosphate ion is provided by a trimetaphosphate salt selected from the group consisting of sodium trimetaphosphate, potassium trimetaphosphate, calcium trimetaphosphate, sodium calcium trimetaphosphate, lithium trimetaphosphate, and combinations thereof.

38. The composition of claim 36, wherein the water-soluble linear polymer formed by the addition reaction comprises polyethylene glycol, methoxypolyethylene glycol, a blend thereof, or a copolymer thereof.

39. The composition of claim 36, wherein the water-soluble linear polymer has an average molecular weight of from about 4,000 daltons to about 20,000 daltons.

40. The composition of claim 36, wherein said composition further comprises a thickening agent.

41. The composition of claim 40, further comprising a binder that reduces the water demand of said composition.

42. The composition of claim 41, further comprising at least one filler and at least one set control additive.

43. The composition of claim 36, further comprising a binder that reduces the water demand of said composition.

* * * * *